Jan. 2, 1951 A. H. STEWART 2,536,399
GLASS ARTICLE AND PROCEDURE FOR MAKING IT
Filed March 23, 1946

INVENTOR
Andrew H. Stewart
BY
Green, McCallister & Miller
ATTORNEYS

Patented Jan. 2, 1951

2,536,399

UNITED STATES PATENT OFFICE 2,536,399

GLASS ARTICLE AND PROCEDURE FOR MAKING IT

Andrew H. Stewart, Beaver, Pa., assignor to The Phoenix Glass Company, a corporation of West Virginia Application March 23, 1946, Serial No. 656,733

7 Claims. (Cl. 49—79)

1

My invention pertains to glass articles and to procedure for making them and particularly to heat treatment of composite or metal coated glass articles, such as those having a coating or layer of metal on surface portions thereof.

Although properly adhering metal coatings have enabled the production of articles having a greater resistance to thermal shocks and mechanical forces, there is a definite need for additional strengthening in cases where the articles are to be used as street light reflectors, cooking utensils, etc.

And, it has been an object of my invention to provide procedure for further strengthening metal coated glass articles.

Another object has been to devise new and improved procedure for making glass articles wherein a desired strain set pattern may be imparted to the glass portions of the article.

A further object has been to provide an improved form of glass article which will have a high resistance particularly to impact shock.

A still further object has been to provide a substantial uniformity of heat treatment of a glass article having a metal backing thereon.

These and many other objects of my invention will appear to those skilled in the art from the description, the claims and the embodiment shown for the purpose of illustration.

Previous to the present invention, it has been common practice to quench or quickly cool glass articles for the purpose of improving their characteristics by setting up inherent stresses or strains within body thickness portions thereof. However, the de-annealing or cooling operations have, heretofore, been limited from a practical standpoint to non-coated glass articles in that

2 the cooling action has to be closely controlled if any advantageous results are obtained. That is, the cooling action must be substantially uniform in its stress-strain producing effect throughout the thickness of the glass body in order to avoid setting up isolated, localized or non-uniform strains within the body which will become a part of the permanent set.

I have found that although those skilled in the art were unable to obtain a substantially uniform cooling action in attempting to quench coated metal articles, that quenching of such types of articles can be successfully effected, provided certain conditions are met. Others have attempted to meet the problem by first tempering the glass body and then applying a coating thereto, but I find that the desired adherency and reflectivity of the coating cannot be thus attained. That is, a high temperature is required for coating purposes and, even if the cooling action is only partially completed and the coating applied before the article cools further, that sufficient adherency cannot be effected and a poor stress or strain pattern set will result.

Figure 1:
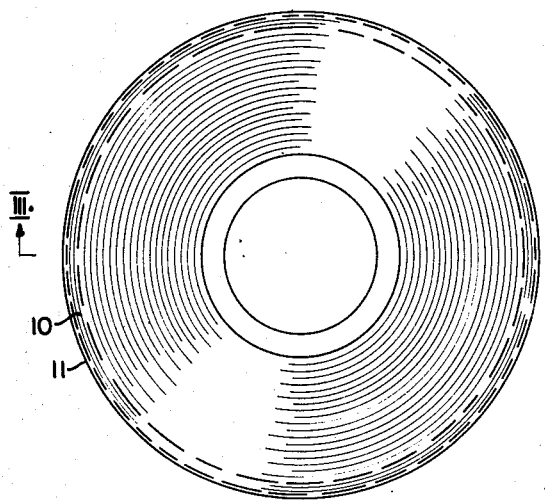
Figure 1 is a top plan view of a reflector chosen as an example.

In accordance with my invention, a glass body or shape, for example, a reflector 10 such as shown in Figure 1 of the drawings, is hot shaped in the usual manner to substantially the desired shape of the article and is then subjected to a metal spray application on a surface thereof, in such a manner as to produce a highly adherent layer 11. In my Patent 2,053,923, I have shown a method of effecting this result wherein, the glass article is subjected to an impact metal spray application before it is cooled and while it is still hot from the shaping operation. That is, in accordance with the present invention, the metal coating should be applied to the article while it is still hot from the shaping operation or after it has been reheated to around 800° F. to 1200° F. in such a manner as to produce a relatively thin coating whose surface, adjacent the glass, will be reflecting, thus indicating pure metal-to-glass contact; the molecules of the coating should be closely adherent to the molecules of the surface of the glass.

I have found that it is necessary to provide a relatively thin coating of not more than substantially .007" and preferably not more than .003" in average thickness which will be sufficient to provide a reflecting surface that may possibly have some pin-point holes therein. That is, the application should be the minimum necessary to provide the desired adherency between the two surfaces and to provide a metal backing to which a heavier metal coating application may be applied after the quenching operation without the necessity of reheating the shape and thus spoiling the stress pattern. I do not limit myself, in the present application, to metal spraying while the article is still hot from the shaping operation, although certain additional advantageous results are obtained thereby which will be later enumerated. That is, the article can be reheated and the metal spray applied; or can be reheated and dipped in molten metal, provided the desired thickness, adherency and reflectivity are obtained.

That is, I wish to obtain a distributed stress pattern that will provide maximum protection against external impact shocks, particularly as applied to the exposed metal coated glass surfaces of the article. That is, the permanent internal stress or strain should have characteristics such that it will tend to offset or neutralize externally applied forces or stresses. To ensure these results, it is necessary to provide an effective approximately uniform cooling action, particularly from the standpoint of the surfaces of the shape that are under compression, see Figure 5. For example, I wish to obtain approximately the same depth of compression strain pattern on the coated face as on the exposed glass face of the article.

Figures 4, 5:
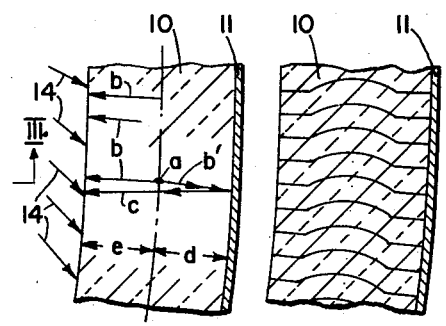
Figure 4 is a greatly enlarged fragmental section taken through the metal-coated glass body of Figure 2 and diagrammatically illustrating how heat of the hotter interior of the glass body is directed or transferred from the metal-coated surface back to the inner or exposed glass surface thereof.
Figure 2:
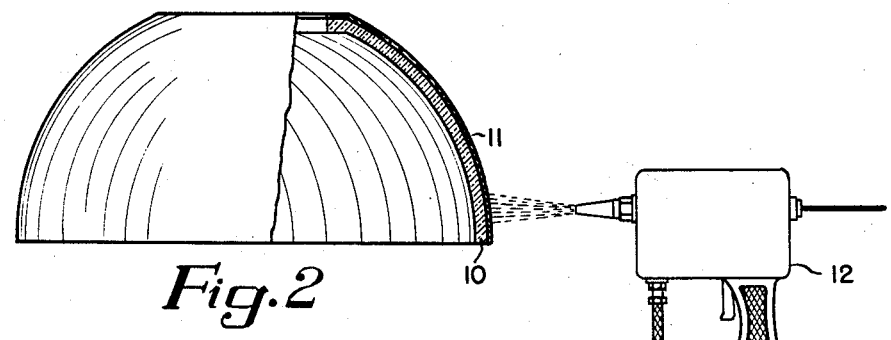
Figure 2 is a side view in elevation and partial section of the reflector of Figure 1 and illustrating a metal coating application thereto, see spray nozzle 12.

I have determined that by avoiding any metal compounds or oxides between the surface of the metal backing and the glass surface, by providing a closely adherent metal-to-glass molecular relationship, and by utilizing a thin coating of suitable metal, a desired uniformity of cooling action can be obtained. If such conditions are not met, cooling action cannot be properly controlled as indicated by the fracture pattern, by the general weakness of the glass body, and by blotches, spots, etc., as shown by a polariscope. Although a metal backing of a suitable material, such as aluminum, for example, will have a heat conductivity of approximately three times the glass body, I have determined that the heat transfer losses through a metal coating of a few thousandths of an inch may be effected to give a desired strain cooling pattern. If the thickness of the metal coating is too great, it will tend to curl and take away a portion of the surface of the glass. A thin coating is not only highly adherent, but permits a higher reheating temperature of the glass shape before quenching. The desired stress or strain pattern is indicated in Figure 5 of the drawings. It is also necessary to provide a pure metal-to-glass seal to eliminate an insulating layer or poor conductor between the metal and the glass which will decrease the effective conductivity of the coating and produce localized hot and cold spots throughout the thickness of the glass.

Although I have found that a greater portion of the temperature change is effected by conductivity, a portion thereof, particularly at the starting temperature of the quenching operation, is effected by heat transfer, due to the relatively hotter interior $a$ of the glass body. This is illustrated in Figure 4. That is, selecting a center point as $a$, it is apparent that the relatively long heat waves will be directed toward the glass surface, see the arrow $b$ and toward the inner or reflective side of the metal coated glass surface, see the arraw $b'$. However, the pure metal backing provides a reflecting surface which reflects the heat of the interior thickness of the glass body as indicated by the arrows $c$ backwardly through the body thickness of the glass 10. The portion of the body of the glass, as indicated by the dimension $d$, will normally be the hotter portion where a backing is used, but the reflection of the heat energy toward the cooler portion $e$ of the body will aid in keeping the over-all temperature of the thickness of the body substantially uniform adjacent to its opposite surfaces. This results in a uniform extent of the compression portions of the glass body, as somewhat diagrammatically represented by the horizontal portions of the curves of Figure 5.

In carrying out my invention there is a balancing of the normally less conductivity of glass from its exposed surface against the normally greater conductivity of the metal backing, its minimum thickness, and the reflectivity of the metal backing to produce substantial uniformity of heat treatment and thus of the resultant stress pattern. The dull, matt-like outer surface of a sprayed coating also has a high heat emissibility.

As shown in Figure 5, rapid chilling places the exposed surfaces in compression which is balanced by tension inside; the compression-tension-compression pattern thus set up is as permanent as the glass body, itself. I contemplate any suitable quenching method such as the application of fluid or air jets to opposite sides of the article, see the arrows 13 and 14 of Figure 3, or by dipping the article in a cooling salt or oil bath.

Figure 3:
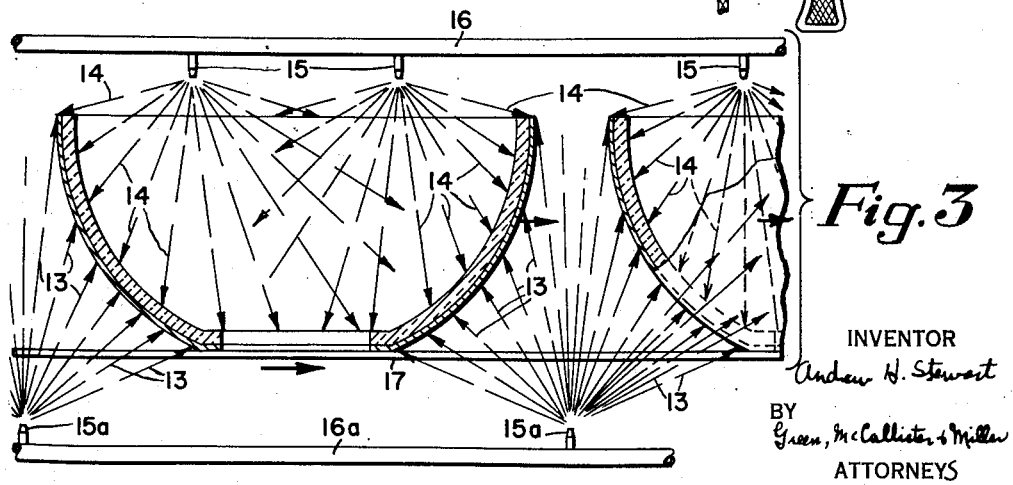
Figure 3 is a vertical sectional view in elevation taken along the line III—III of Figure 1 and showing a cooling fluid or air application to opposite faces or surface portions thereof.

By way of illustration, as shown in Figure 3, a cooling fluid header 16 supplies cooling air spray jets 15 that are directed against the inside or concave glass surface of reflectors carried on a narrow width conveyer belt 17; and, a cooling fluid header 16a supplies cooling air jets 15a (offset with respect to the belt 17) that are directed on the opposite or metal-coated exterior or convex surface thereof.

In carrying out my invention, any suitable metals may be employed, although I prefer those having suitable reflectivity and elasticity and a better conductivity than glass and preferably having a melting point above 1200° F., such as aluminum or alloys thereof. The outer surface of a sprayed metal layer 11 will be somewhat rough or granular in appearance to provide a suitable surface for subsequent application of the same or other suitable backing metals to the desired strength-producing thickness. This last operation, as previously intimated, is carried out after the quenching operation or without reheating the article; that is, the article is still cool or at normal room temperature.

The particles of molten metal impact spray are slightly work hardened as indicated by X-ray analysis. The coating is built up from metal particles that are flattened and somewhat superficially oxidized on their outer surfaces.

Before quenching, I preferably reheat the metal backed article above its normal annealing temperature to as high a point as possible without distorting the shape or within approximately 50° F. of the softening point, preferably within 25° F. thereof. I found that the metal backing permits a slightly higher temperature than would otherwise be possible. For example, I would reheat lime glass to about 1100° F. and then quench, as indicated above. Of course, the type of glass and the type of shape will enter into the maximum temperature to which the article can be reheated. Since glass, leaving a shaping mold, is hotter internally than externally thereof, I also contemplate reheating the article for quenching before it has completely cooled from its shaping operation, but after the preliminary thin metal coating has been applied. It will thus appear that the interior of the glass body, as diagrammatically represented by the point a of Figure 4, will be relatively hot after the heating incident to the spraying operation and that such heat is utilized in the subsequent reheating operation to provide a substantially hotter or higher temperature heat which is utilized, as previously described in connection with Figure 4 of the drawings.

Although for the purposes of illustration I have shown one form of article or application of my invention, it will be apparent that other metal backed articles of different shapes can be utilized and their characteristics improved in accordance with the principles thereof.

What I claim is:

1. A process for making a shaped glass reflector from a clear glass body provided with an inner concave surface and an outer convex surface which comprises, applying a molten metal having a melting point above 1200° F. and having efficient light reflective properties in its pure state as a coating to the outer convex surface of the glass body while the glass body is heated to a temperature of about 800° to 1200° F. to provide an inner and highly adherent pure-metal reflective surface along the outer convex surface of the body, then before the interior of the glass body has completely cooled from the above operation, reheating the metal-coated glass body to a temperature above its normal annealing temperature and at least 25° F. below its softening temperature, and quickly cooling the metal-coated body by applying a cooling medium to its inner concave glass surface and to its outer convex metal-coated surface, and thereby imparting a substantially uniform compression-tension-compression strain pattern through the cross-section of the glass body from the inner concave to the outer convex surface thereof.

2. A process as defined in claim 1 wherein, the molten metal employed is aluminum.

3. A process of making a shaped glass reflector from a clear glass body provided with an inner concave surface and an outer convex surface which comprises, applying in a molten condition a metal having a melting point of above about 1200° F. and having efficient light reflective properties in its pure state as a coating to a thickness of less than .007" on the outer convex surface of the glass body while the body is heated to a temperature of about 800° to 1200° F. to provide the coating with a closely adherent inner pure-metal reflective surface along the outer convex surface of the glass body and an oxide-metal outer exposed surface, then before the interior of the glass body has completely cooled from the above operation, reheating the metal-coated glass body to a temperature above its normal annealing temperature and at least 25° F. below its softening temperature, and quickly cooling the metal-coated body by applying a cooling medium to its inner concave glass surface and to its outer convex metal-coated surface, and thereby imparting a substantially uniform compression-tension-compression strain pattern through the cross-section of the glass body from the inner concave to the outer convex surface thereof.

4. A process of making a shaped glass reflector from a clear glass body provided with an inner concave surface and an outer convex surface which comprises, applying in a molten condition a metal having a melting point of above 1200° F. and having light reflective properties in its pure state as a coating to a thickness of less than .007" on the outer convex surface of the glass body while the body is heated to a temperature of about 800° F. to 1200° F. to provide the coating with a closely adherent inner pure-metal reflective surface along the outer convex surface of the body and an oxide-metal outer exposed surface, then before the interior of the glass body has completely cooled from the above operation, reheating the metal-coated glass body to a temperature above its normal annealing temperature and within a range of about 25° to 50° F. below its softening temperature, and quenching the metal-coated glass body by applying cooling air to its inner concave glass surface and to its outer convex metal-coated surface, and thereby imparting a substantially uniform compression-tension-compression strain pattern through the cross-section of the glass body from the inner concave to the outer convex surface thereof.

5. A quenched glass reflector having a glass body of curved shape and provided with an inner concave surface and an outer convex surface, said outer convex surface having a closely adherent metal coating thereon of a thickness of less than about .007" applied to the glass body in a molten condition before quenching and while the glass body is heated to an elevated temperature of between 800° to 1200° F. and below its softening temperature, said metal coating having a closely adherent inner pure-metal reflective surface along said outer convex surface of the glass article and having an outer exposed metal-oxide dull surface, the glass body of the article having a substantially uniform compression-tension-compression strain pattern through its cross-section from the inner concave to the outer convex surface thereof as effected by, before the interior of the glass body has completely cooled from the above operation, reheating the metal-coated glass shape to a temperature above its normal annealing temperature and at least 25° F. below its softening temperature, and quenching its inner concave glass surface and its outer convex metal-coated surface.

6. A glass article as defined in claim 5, wherein the metal coating is aluminum.

7. A quenched glass article having a glass body of curved shape and provided with an inner concave surface and an outer convex surface, said outer convex surface having a closely adherent metal coating thereon of a thickness of less than about .007" applied thereto in a molten condition before quenching and while the glass body is heated to an elevated temperature of between 800° to 1200° F. and below its softening temperature, said metal coating having a closely adherent inner pure-metal reflective surface along said outer convex surface of the glass article and having an outer exposed metal-oxide dull surface, the glass body of the article having a substantially uniform compression-tension-compression strain pattern through its cross-section from the inner concave to the outer convex surface thereof as effected by, before the interior of the glass body has completely cooled from the above operation, reheating the metal-coated glass shape to a temperature above its normal annealing temperature and at least 25° F. below its softening temperature, and quenching its inner concave glass surface and its outer convex metal-coated surface, a compression portion of the strain pattern adjacent the outer convex surface of the glass body being of substantially equal extent with a compression portion of the strain pattern adjacent the inner concave surface of the glass body.

ANDREW H. STEWART.

REFERENCES CITED

The following references are of record in the file of this patent:

UNITED STATES PATENTS

| Number | Name | Date |
|---|---|---|
| 1,483,461 | Littleton, Jr. | Feb. 12, 1924 |
| 2,053,923 | Stewart | Sept. 8, 1936 |
| 2,119,608 | Stewart | June 7, 1938 |
| 2,123,049 | Irby | July 5, 1938 |
| 2,162,980 | Smith | June 20, 1939 |
| 2,198,734 | Littleton | Apr. 30, 1940 |
| 2,233,622 | Lytle | Mar. 4, 1941 |
| 2,236,911 | Long | Apr. 1, 1941 |